United States Patent
Hsing

(10) Patent No.: US 8,412,016 B2
(45) Date of Patent: Apr. 2, 2013

(54) COMMUNICATION CABLE CONNECTION BOX WITH WATERPROOF DEVICE OF ELASTIC RUBBER SHRINKING PIPE

(75) Inventor: Chihkuang Hsing, New Taipei (TW)

(73) Assignee: Yu-Fen Chi, New Taipei (TW)

( * ) Notice: Subject to any disclaimer, the term of this patent is extended or adjusted under 35 U.S.C. 154(b) by 0 days.

(21) Appl. No.: 13/203,468

(22) PCT Filed: Mar. 10, 2009

(86) PCT No.: PCT/CN2009/000257
§ 371 (c)(1),
(2), (4) Date: Nov. 4, 2011

(87) PCT Pub. No.: WO2010/096953
PCT Pub. Date: Sep. 2, 2010

(65) Prior Publication Data
US 2012/0093472 A1      Apr. 19, 2012

(30) Foreign Application Priority Data

Feb. 26, 2009   (CN) .......................... 2009 1 0126320

(51) Int. Cl.
*G02B 6/44* (2006.01)
*G02B 6/00* (2006.01)
(52) U.S. Cl. ........... 385/135; 385/99; 385/100; 385/134
(58) Field of Classification Search ............... 385/99, 385/100, 134–137
See application file for complete search history.

(56) References Cited

U.S. PATENT DOCUMENTS

| | | | |
|---|---|---|---|
| 3,992,569 A | * | 11/1976 | Hankins et al. ................. 174/92 |
| 4,504,699 A | * | 3/1985 | Dones et al. ................ 174/84 R |
| 7,304,242 B1 | | 12/2007 | Dower et al. |

FOREIGN PATENT DOCUMENTS

| | | |
|---|---|---|
| CN | 2446701 | 9/2001 |
| EP | 0547656 A1 | 6/1993 |
| EP | 1261094 A1 | 11/2002 |
| WO | 0038291 | 6/2000 |
| WO | 02092328 A1 | 11/2002 |

OTHER PUBLICATIONS

Supplementary European Search Report, Application No./Patent No. 09840621.8-1251/2403085 PCT/CN2009000257, Sep. 11, 2012, 8 pp.

* cited by examiner

*Primary Examiner* — Brian Healy
*Assistant Examiner* — Mary El Shammaa
(74) *Attorney, Agent, or Firm* — Volpe and Koenig, P.C.

(57) ABSTRACT

A waterproof communication cable connection box includes a protective cover, a cable pass-through end surface, a hollow cylindrical pipe formed on the cable pass-through end surface, an elastic rubber shrinking pipe, and a flexible hard plastic strip provided on the inner wall of the elastic rubber shrinking pipe. The plastic strip will be removed after a cable passes through the cable connection box so that the elastic rubber shrinking pipe closely covers the hollow cylindrical pipe and the cable part exposing outside of the hollow cylindrical pipe.

20 Claims, 6 Drawing Sheets

COMMUNICATION CABLE CONNECTION BOX WITH WATERPROOF DEVICE OF ELASTIC RUBBER SHRINKING PIPE

CROSS-REFERENCE TO RELATED APPLICATION AND CLAIM OF PRIORITY

The application claims the benefit of the International Patent Application No. PCT/CN2009/000257, filed on Mar. 10, 2009, in the World Intellectual Property Office, the disclosures of which are incorporated herein in their entirety by reference.

FIELD OF THE INVENTION

The present invention relates to a communication cable splice box having a shrinkable rubber tube waterproof device, especially one that ensures simple and safe construction, without the need of tools or a fire source, and the external diameter of the applicable cable extensively varies. The present invention is able to overcome the water leakage problems on the cable splice box in the current technology of the heat-shrink cable splice box, where the torched heat-shrink tube softens and loosens result from heating once more after a heat-shrink tube for cable entrance and seal was heated with torch and then the other heat-shrink tubes for cable entrance were heated therewith.

BACKGROUND OF THE INVENTION

As cables laying in each country in the world is seeking to be disposed underground as much as possible, and this chiefly relies on the network of pipelines. The cable splice boxes that connect cables underground are situated in the manholes and hand-holes of underground cable pipelines, and many manholes and hand-holes accumulate huge amounts of water yearly, thus the cable splice boxes situated within these holes are immersed in water yearlong. Please refer to FIG. 1, which is the cross-section diagram of the underground layout of cable splice boxes. In FIG. 1, manhole covers 11, 12 have manholes 111, 121 situated underneath. Cable splice boxes 13, 14 are disposed in manholes 111, 121, and cable splice boxes 13, 14 are connected by cable 16. Cable splice boxes 13, 14 are connected by cables 15, 17, respectively, to other cable splice boxes (not shown). In practice, cables 15, 16, 17 in manholes 111, 121 are curled up. Regardless of whether a cable splice box is made with an electric cable or a fiber optic cable, if there is insufficient waterproofing, water leaking into cable splice boxes due to water built up from manholes or hand-holes will affect the transmission quality of the cable in addition to accelerating the deterioration of the cable, resulting in transmission malfunctions and reduction of the lifespan of cables.

Existing technology of cable networking and cable splicing techniques, in telecommunications, cable television, monitoring systems and other types of cable transmission industries, has long relied on heat-shrink cable splice boxes. Although the manufacturing cost for a heat-shrink cable splice box is comparatively lower, the cable has a longer applicable external diameter, along with simpler and faster construction, thus being widely used in the industry, the heat-shrink cable splice box is heavily criticized for its common water leakage problems. Please refer to FIG. 2(A), which is a vertical view of a heat-shrink cable box in the current technology. In FIG. 2(A), hollow cylindrical pipes 23A, 23B, 23C, 23D, 23E, 27 are configured on cable entrance board 21 of heat-shrink cable splice box 20 (abbreviated as splice box), and main cables 24A, 24B go through hollow cylindrical pipe 27 into splice box 20. The main cables 24A, 24B are separated by manifold clip 29 used for heat-shrink tubes. Divided cables 25A, 25B, 25C, 25D, 25E, respectively, go through hollow cylindrical pipes 23A-23E to enter splice box 20. Please refer to FIGS. 2(B) and 2(C), which are diagrams showing the waterproofing structure of heat-shrink cable splice box in the current technology. In FIGS. 2(B) and 2(C), heat-shrink cable splice box 30 (abbreviated as splice box) at least is constructed with protective cover 22, cable entrance board 31 and hollow cylindrical pipes 32, 33A, 33B. The user firstly takes main cables 24A, 24B to penetrate hollow cylindrical pipe 32 that is wrapped by heat-shrink tube 36, through opening 38A into the splice box. Main cables 24A, 24B are spaced by a manifold clip used for heat-shrink pipes, then heat-shrink tube 36 and manifold clip are torched with fire, and the waterproofing of the cable entry board whereby main cables 24A, 24B goes through is accomplished. The divided cable 35B penetrates hollow cylindrical pipe 33B that is wrapped by heat-shrink tube 37, through opening 38B into the splice box, and then heat-shrink pipe 33B is torched, in order to complete the waterproofing of the entry board where the divided cable 35B enters and exits. The main cables 24A, 24B and divided cable 35B have their spliced part stored in the cable splicing distribution board 39. However, when torching the heat-shrink pipe 37, the already torched heat-shrink pipe 36 being nearby heat-shrink pipe 37 is subjected to further heating, thus softens, loosens and causes water leakage in splice box 30. Similarly, during the torching of other heat-shrink pipes of cable entry opening 33A, neighboring heat-shrink pipes that are already torched are subjected to further heating, therefore they soften, loosen and cause water leakage in splice box 30.

For example, a communication optical cable splice box's cable entrance board is usually 15 cm to 20 cm in diameter or even smaller, while the cable entry board usually is required to a provide access for 6 or more cables penetrated, so that the openings for cable access on the cable entry board are very close to each other. Therefore, in the current waterproofing technology of cable access openings of the heat-shrink cable splice box, one has to complete torching the heat-shrink tube of the first cable access opening, and then torch heat-shrink tubes for other cable access openings. This often results in heat-shrink tubes that are already completed to be subjected to further torching, causing them to soften, loosen and resulting in water leakage problems in splice boxes. This shortcoming and vital flaw has always been the most pressing and difficult problem that needs to be solved, in the technological field.

Taiwan's telecommunications industry, for example, due to the popularity and trend of fiber-optic broadband service, Chunghwa Telecom in recent years layed out fiber-optic cables on a massive scale and heavily utilized fiber-optic cable splice boxes for accessing fiber-optic cables, and also announced that beginning in 2009, for five consecutive years, will invest NT $30 billion a year, a total of NT $150 billion of funds for fiber-optic network infrastructure. In recent years, the company placed heat-shrink cable splice boxes in manholes and hand-holes, with far more than half of them suffering from serious leakage. As the water leakage problem in heat-shrink cable splice box is not resolved, the company has had to purchase mechanical cable splice boxes that are 3 times more expensive than heat-shrink cable splice boxes, and a variety of mechanical means of sealing to establish a waterproof structure for cable access openings. The suitable cable outer diameter for these waterproof cable access openings is restrictively small, accessories needed are diverse and complicated, with cumbersome construction procedures, needing a variety of tools, resulting in inconvenience and higher costs of construction, among other issues. Mechanical cable splice boxes, in addition to being less straightforward and efficient than heat-shrink cable splice boxes, the procurement costs have increased threefold. Thus, by eliminating the shortcomings and improving the waterproofing capacity of heat-shrink cable splice boxes, not only can communication quality issues due to water leakage in heat-shrink cable splice boxes be avoided, it also can significantly reduce the cost of investing enterprises.

It is therefore attempted by the applicant to deal with the above situation encountered in the prior art.

SUMMARY OF THE INVENTION

In order to overcome the shortcomings of existing technology, this invention aims to provide a communication cable splice box with a shrinkable rubber tube device that is flexible and waterproof, the cable splice box includes a protective cover, at least one cable entry board and at least one flexible rubber shrinkable tube. At least one hollow cylindrical tube is configured on the cable entrance board, and provides at least one cable to go through the at least one hollow cylindrical tube into the cable splice box. To waterproof the cable access opening, first wrap the hollow cylindrical tube with a flexible rubber shrinkable tube (abbreviated as shrinkable tube), then sequentially penetrate the shrinkable tube and the hollow cylindrical tube with the cable into the cable splice box, then extract one coiled plastic strip from interior wall of the shrinkable tube, after extracting the plastic strip, the shrinkable tube is tightly wrapped around the hollow cylindrical tube and a part of the cable that has yet passed through the hollow cylindrical tube.

Shrinkable tubes are hollow cylindrical composite rubber tubes that are highly flexible and ductile, and the walls of hollow cylindrical rubber tubes are first covered with fireproof hard plastic strips that are coiled into a screw like tube. The hollow diameter of the stretched shrinkable rubber tube is wider than that of the hollow cylindrical tube and the outer diameter of cable which will penetrate the hollow cylindrical tuber diameter. When the plastic strip is extracted, the stretched hollow diameter immediately shrinks elastically, returning to the smaller diameter prior to being stretched, and the smaller diameter is smaller than the hollow cylindrical tube and the outer diameter of the cable which penetrates the hollow cylindrical tube. This results in the exterior of the hollow cylindrical tube and a portion of the cable that has not penetrated the hollow cylindrical tube to be tightly wrapped around each other, forming a waterproof structure. This waterproof structure can solve the technical problems caused by torching to waterproof the access openings for cables in heat-shrink cable splice box. When torching other heat-shrink tubes for cable openings, it often results in heat-shrink tubes that are already completed to be subjected to further torching, causing them to soften, loosen and resulting in water leakage problems in splice boxes. Since the current invention utilizes simple and safe construction, without the need for tools or a fire source, with a wider applicable outer diameter of cable along with other advantages, it can significantly reduce the cost of investing enterprises.

Communication cable splice boxes can utilize straight direct splicing, mid-span splicing and branch splicing operation of the backbone cable, three different types and forms of communication cable splicing. Using the conventional heat-shrink cable splice box as example, while carrying out straight direct splicing and mid-span splicing, the main cable and/or divided cable can both penetrate one hollow cylindrical tube of splice box with a single cable, and splicing is carried out in the splice box. While carrying out branch splicing operation of the backbone cable, the main cable after bending without breaking, in a dual cable manner penetrates a hollow cylindrical tube, then enters the splice box to carry out branch splicing operation of the backbone cable. However, in actuality, the accessing of divided cable still is made by penetrating a hollow cylindrical tube with only a single cable into a splice box to carry out splicing. Therefore, while carrying out branch splicing operation of the backbone cable, unless using a suitable way to modify the cross-section of the two cables of the main cable responsible for mid-span connecting splicing into a rounded, oval or a groove-less polygonal shape, the flexible rubber shrinkable tube cannot carry out an effective waterproofing treatment between the grooves of two cables.

As for using the communication cable splice box, the main cable is first introduced, and then the divided cable is introduced. Thus, when the present invention uses branch splicing operation of the backbone cable, the waterproofing of the hollow cylindrical tube where the two main cables that are introduced into the cable box's cable opening can be carried out by heat-shrink tube, whereas the waterproofing of divided cables will be carried out by the flexible rubber shrinkable tube. As for the first cable opening for introducing the main cable, the user needs to first waterproof the heat-shrink tube by torching, before introducing the main cable into the first cable access opening, then after other divided cables are introduced, they are waterproofed using the flexible rubber shrinkable tube. Because using the flexible rubber shrinkable tube to carry out the waterproof treatment does not require torching, therefore there will not be problems resultant of the prior technique of torching the heat-shrink tube to complete the waterproofing of the first cable opening. When torching other heat-shrink tubes for cable openings, it often results in heat-shrink tubes that are already completed to be subjected to further torching, causing them to soften, loosen and resulting in water leakage problems in splice boxes.

After studying the water leaking issues of the heat-shrink cable splice box, the inventor of the invention found two reasons for water-leakage in cable boxes. The first one is due to ill-structured waterproofing of the contact portion between the protective cover and the cable's entry board, and the second one is due to the loosening of attachment between the exterior of the hollow cylindrical tube and the heat-shrink tube and the attachment between cable and heat-shrink tube. Therefore, even if improving the problem of water leakage of the contact portion between the protective cover and the cable entry board, there are still many cable splice boxes suffering from water leakage.

The second reason stated above, often as a result of completing the heat-shrink waterproofing of a splice box, due to shifting the cable box into/out of the hand-hole or manhole to carry out cable rerouting, threading out divided cable, maintenance and such activities, cables are prone to being twisted, bent/or under pressure, causing the waterproof treatment section of heat-shrink tube to loosen, resulting in water leakage in splice boxes. In general, most cables are multi-coated with polyethylene. However, adhesion strength is limited between the thermal adhesive that coats the cable of the heat-shrink tube's interior, and the multi-coated polyethylene cable, thus resulting in the ease of cables twisting, bending and/or loosen under pressure.

In order to overcome the shortcomings of existing technology, after thorough and extensive research, the present invention includes at least one cable fixture device on the exterior of the splice box, the device includes the first fixture and the second fixture. The first fixture is fixed in the splice box, the second fixture connects with the first fixture, and the second fixture is in fixed to enter the cable of the splice box. The cable fixture device also includes a supporting portion, connecting the first fixture with the second fixture. The cable fixture device is made of strong metal that is resistant to bending or molding, plastic and combinations thereof. When the cable fixture device reinforces the cable, although moving the splice box will cause the cables waterproofed by heat-shrink tube to twist and move, although subjected to twisting, moving and pressure, the cable has its pivot on cable fixture device's second fixture. Since the waterproof portion that the heat-shrink tube wraps is positioned between the first fixture and second fixture, the heat-shrink tube will not loosen due to the pressure from the twisting and moving of the cable.

The cable fixture device is not only used in securing the cable that has undergone heat-shrink tube waterproofing treatment, it can also be used to secure the cable that has undergone flexible rubber shrinkable waterproofing treatment. The cable fixture device's first fixture portion can be in one piece or be buried in the cable access entry board, and also utilize screw connection, mortise joint, a clamp joint, a ring fastener, a band fastener and similar means of securing on the splice box. The second fixture can be a continuous piece with the first fixture, or mechanically joined with the first fixture. The cables introduced can be secured on the second fixture with the second fixture through a clamp joint, a ring fastener, a band fastener and similar means. The supporting portion, the first fixture and the second fixture are one continuous piece or mechanically joined together, and the supporting portion's first connective end is secured on the first fixture, while the supporting portion's second end is used to secure the incoming cable, and the incoming cable can be secured on the second end by using a clamp joint, a ring fastener, a band fastener and similar means. Cable sections that have yet to be wrapped by shrinkable tube or heat-shrink tube, cable sections that have been wrapped by shrinkable tube or heat-shrink tube and the convergence point of the two aforementioned sections can be secured by the cable fixture device. Cables situated in splice box can utilize the present invention's cable fixture device to be secured furthermore.

The above objectives and advantages of the present invention will become more readily apparent to those ordinarily skilled in the art after reviewing the following detailed descriptions and accompanying drawings.

DETAILED DESCRIPTION OF THE PREFERRED EMBODIMENT

The present invention will now be described more specifically with reference to the following Embodiments. It is to be noted that the following descriptions of preferred Embodiments of this invention are presented herein for purpose of illustration and description only; it is not intended to be exhaustive or to be limited to the precise form disclosed.

The present proposed invention "COMMUNICATION CABLE CONNECTION BOX WITH WATERPROOF DEVICE OF ELASTIC RUBBER SHRINKING PIPE" can be thoroughly understood through the following illustration of the approach to implementation.

Embodiment 1

Figure 3A:
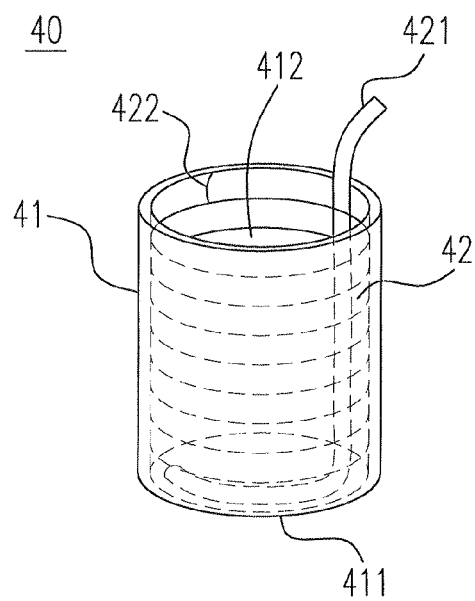
FIG. 3(A) is a diagram showing flexible rubber shrinkable tube used in Embodiment 1 of the present invention.

Please refer to FIG. 3(A), which is a diagram showing a flexible rubber shrinkable tube used in Embodiment 1 of the present invention. In FIG. 3(A), the flexible rubber shrinkable tube 40 (abbreviated as shrinkable tube) is constructed by the flexible and ductile ethylene propylene rubber (EPR) tube 41 (hereinafter abbreviated as "rubber tube") and a rigid polyethylene plastic strip 42 (hereinafter abbreviated as "plastic strip"), of which rubber tube 41 having a first opening 411 and a second opening 412, and plastic strip 42 has a first end 421 and a second end 422. The rubber strip 42 is first coiled in a spiral pattern within the inner wall of the hollow rubber tube 41, the hollow diameter of rubber tube 41 is stretched by plastic strip 42, while the hollow diameter of the stretched rubber tube 41 is greater than the outer diameter of the hollow cylindrical tube of the cable splice box, and also the outer diameter of the cable. Plastic strip 42 is ultrasonically welded for every 5 cm, in order to increase the strength of the tubular structure of plastic strip 42, attributing plastic strip 42 with solder joints that can be torn apart by bare hands. In addition, said plastic strip 42 can also be replaced by a rubber or metal strip that is fireproof and can stretch the hollow diameter of rubber tube 41.

Figure 3B:
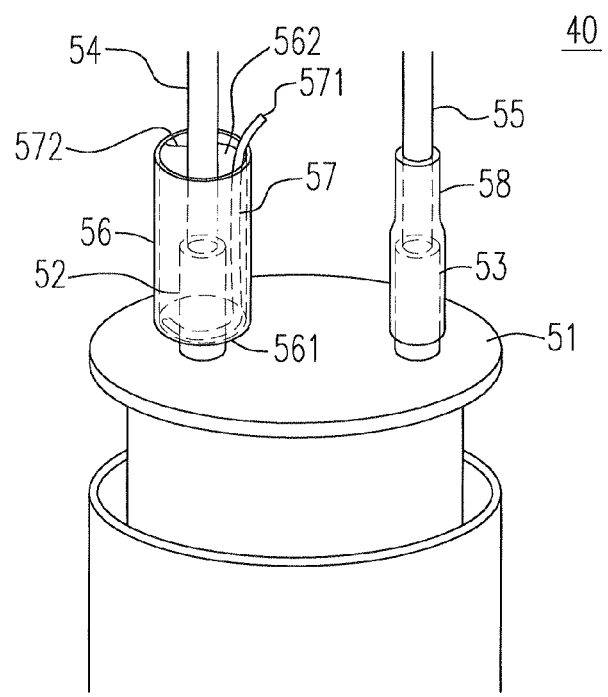
FIG. 3(B) is a diagram of the communication cable splice box with a shrinkable rubber tube device that is flexible and waterproof, shown in Embodiment 1 of the present invention.

Please refer to FIG. 3(B), is a diagram of the communication cable splice box with a shrinkable rubber tube device that is flexible and waterproof, shown in Embodiment 1 of the present invention. In FIG. 3(B), communication cable splice box 50 (abbreviated as "splice box" thereafter) at least is constructed of cable entrance board 51, a protective cover, hollow cylindrical tubes 52, 53 and flexible rubber shrinkable tube 56, hollow cylindrical tubes 52, 53 each has an opening (not shown) where the cable penetrates the cable entrance board 51, allowing cables to penetrate the entry board in order to enter the interior of splice box 50. Splice box 50 can supply straight direct splicing and mid-span splicing, two different forms of cable splicing. When waterproofing the seams between splice box 50 and the cable, the first opening 561 of flexible rubber shrinkable tube 56 (abbreviated as "shrinkable tube" thereafter) is firstly wrapped around hollow cylindrical tube 52, then cable 54 penetrates sequentially through the second opening 562 of the shrinkable tube 56, and through the hollow cylindrical tube 52, into the interior of splice box 50. Next, the first end 571 of plastic strip 57 which has already penetrated the second opening 562 is extracted, the hollow diameter stretched by the plastic strip will immediately shrink, returning to a smaller diameter prior to being stretched, whereas the smaller diameter will be smaller than the outer diameter of the hollow cylindrical tube and the outer diameter of the cable. When continuously extracting plastic strip 57 until the second end 572 of the plastic strip 57 detaches from shrinkable tube 56, the shrinkable tube 56 will tightly wrap around the hollow cylindrical tube 52 and a portion of cable 54, accomplishing the waterproof treatment of splice box 50. This waterproofing operation is also shown in FIG. 3(B), after extracting the plastic strip (not illustrated) from the shrinkable tube 58, it will tightly wrap around hollow cylindrical tube 53 and portion of cable 55, accomplishing the waterproofing treatment of the cable access openings of a splice box.

The approach of Embodiment 1 of the present invention can effectively and individually waterproof every cable which penetrates the splice box, not only without the need or necessity to torch the shrinkable tube, the user can extract plastic strips using bare hands, without the need for tools, in order to tightly wrap the shrinkable tube around the hollow cylindrical tube and a portion of the cable. In addition, the shrinkable tube is flexible. When the cable is twisted due to either the placing of the waterproofed splice box into the manhole or from transporting the splice box, the shrinkable tube will also twist accordingly, but water will not be allowed to leak into the joint between the shrinkable tube and cable, and also the joint between the shrinkable tube and the hollow cylindrical tube.

Embodiment 2

Figure 1:
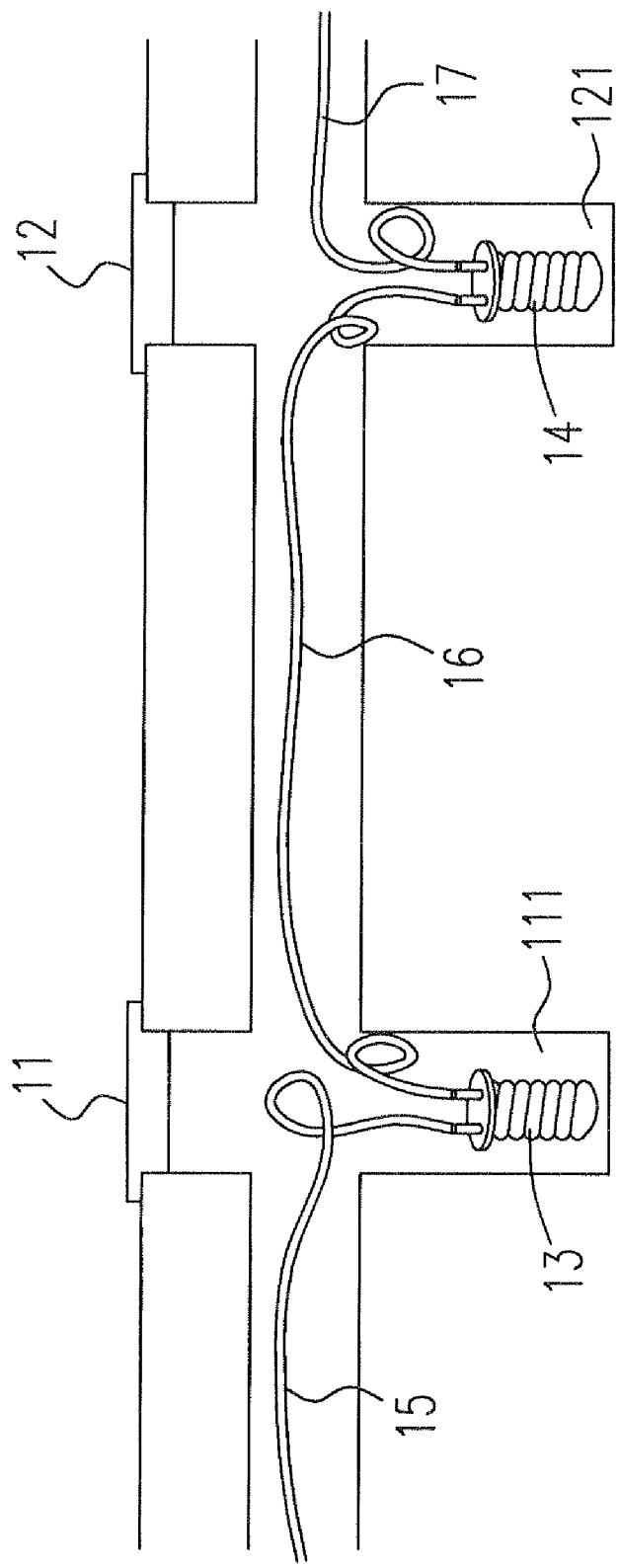
FIG. 1 is a pipe cross-section diagram of the underground layout of the cable splice box.
Figure 2A:
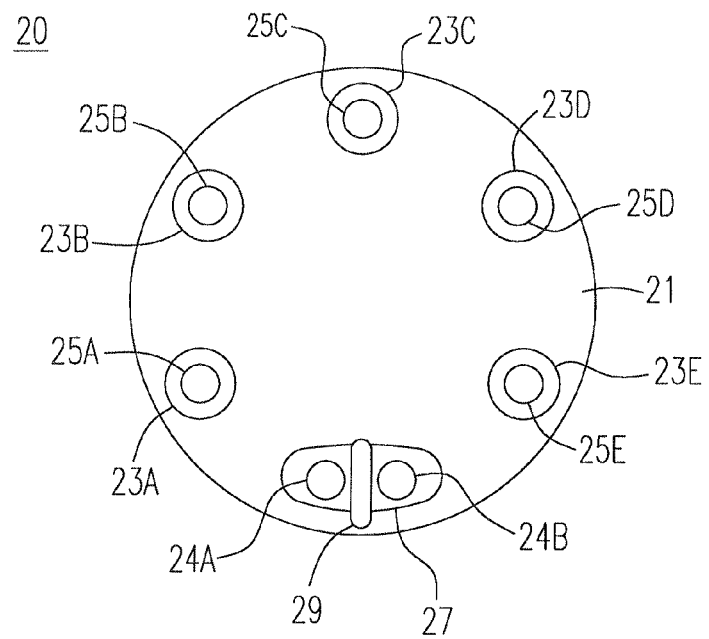
FIG. 2(A) is a top view of the technique of heat-shrink cable splice box in the existing technology.
Figure 2B:
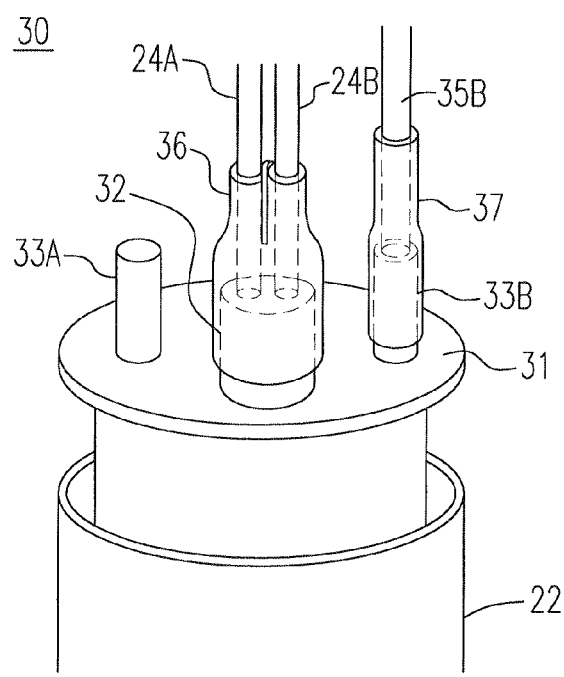
FIG. 2(B) is a diagram showing the technique of the waterproof treatment structure of heat-shrink cable splice box in the existing technology.
Figure 2C:
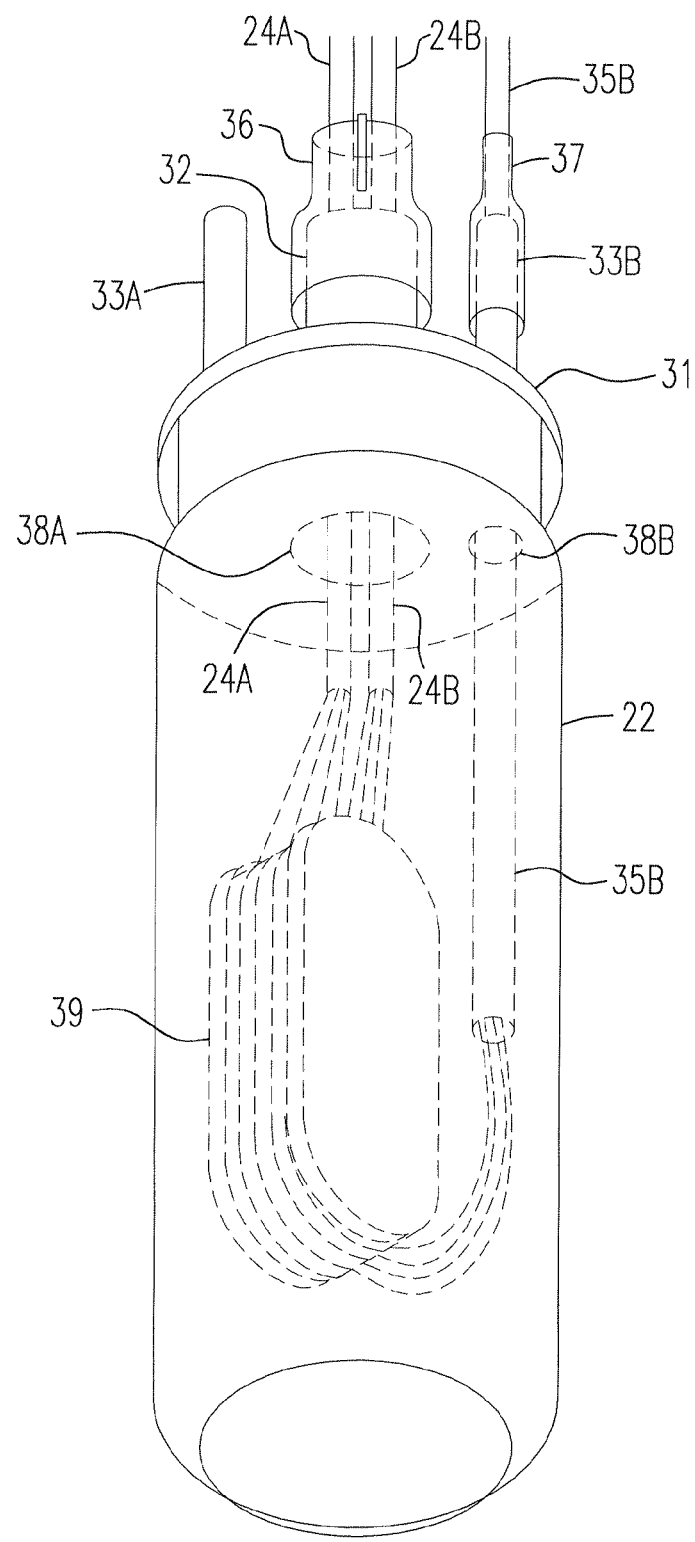
FIG. 2(C) is a diagram showing the technique of the waterproof treatment structure of cables entering heat-shrink cable splice box in the existing technology.
Figure 4:
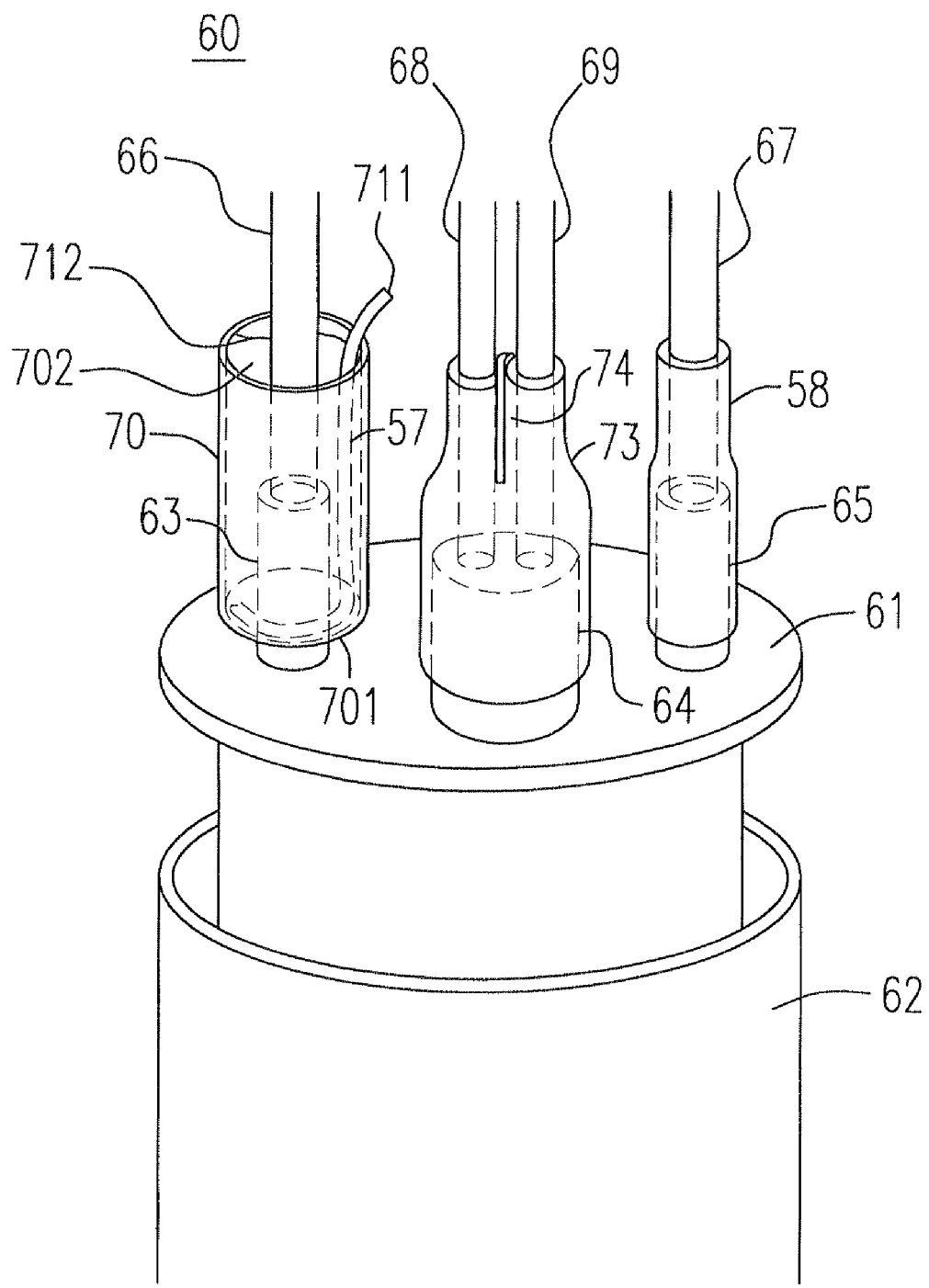
FIG. 4 is a diagram of the communication cable splice box with a shrinkable rubber tube device that is flexible and waterproof, shown in Embodiment 2 of the present invention.

Please refer to FIG. 4, which is a diagram of the communication cable splice box with a shrinkable rubber tube device that is flexible and waterproof, shown in Embodiment 2 of the present invention. In FIG. 4, communication cable splice box 60 (abbreviated as "splice box" thereafter) at least is constructed of cables entry board 61, protective cover 62 (partially), hollow cylindrical tubes 63, 64, 65, flexible rubber shrinkable tube 70, heat-shrink tube 73 and manifold clip 74 used for heat-shrink tube. Splice box 60 can supply straight direct splicing, mid-span splicing and branch splicing operation of the backbone cable, three different types and forms of splicing. According to FIGS. 2(A), 2(B) and "Background of the invention" part, the main cables 68, 69 penetrate hollow cylindrical tube 64 which is wrapped with heat-shrink tube 73, the manifold clip 74 used for heat-shrink tube is used to clip the seams between main cables 68, 69, and then heat-shrink tube 73 and manifold clip 74 are torched to accomplish the waterproofing between the main cables 68, 69 and hollow cylindrical tube 64. As for waterproofing the cable 66 entering the hollow cylindrical tube 63, follow the same approach as Embodiment 1, the first opening 701 of flexible rubber shrinkable tube 70 (abbreviated as "shrinkable tube" thereafter) is firstly wrapped around hollow cylindrical tube 63, and then cable 66 sequentially penetrates the second opening 702 of shrinkable tube 70, then through hollow cylindrical tube 63 into the interior of splice box 60. Next, the first end 711 of the plastic strip 57 which penetrated the second opening 702 is extracted, and the diameter of the hollow cylindrical tube stretched by the plastic strip 57 will immediately shrink, returning to a smaller diameter prior to being stretched. When continuously extracting plastic strip 57 until the second end 712 of the plastic strip 57 detaches from shrinkable tube 70, the shrinkable tube 70 will tightly wrap around the hollow cylindrical tube 63 and a portion of cable 66, accomplishing the waterproof treatment of splice box 60. The results from this waterproofing treatment is illustrated by shrinkable tube 58 in FIG. 4, after extracting the plastic strip (not illustrated) from the shrinkable tube 58, it will tightly wrap around hollow cylindrical tube 65 and portion of cable 67.

Therefore, in Embodiment 2 of the present invention, the user only needs to first waterproof the heat-shrink tube by torching, before introducing the main cable into the first cable access opening, then after other divided cables are introduced, they are waterproofed using the flexible rubber shrinkable tube. Because using the flexible rubber shrinkable tube to carry out the waterproof treatment does not require torching, there will not be problems resultant of the prior technique of torching the heat-shrink tube to complete the waterproofing of the first cable opening. When torching other cable openings of heat-shrink tubes, it often results in heat-shrink tubes that are already completed to be subjected to further torching, causing them to soften, loosen and resulting in water leakage problems in splice boxes.

Embodiment 3

The waterproof treatment of Embodiments 1 and 2 of the present invention can effectively solve the water-leakage problems in splice boxes. Furthermore, the user can secure the cable entering the splice box with a cable fixture device secured on the exterior of the splice box, strengthening the waterproofing of the splice box, thus the loosening of joint between the cable and shrinkable tube is prevented when the splice box is transported or when the cable is twisted or bent.

Figure 5:
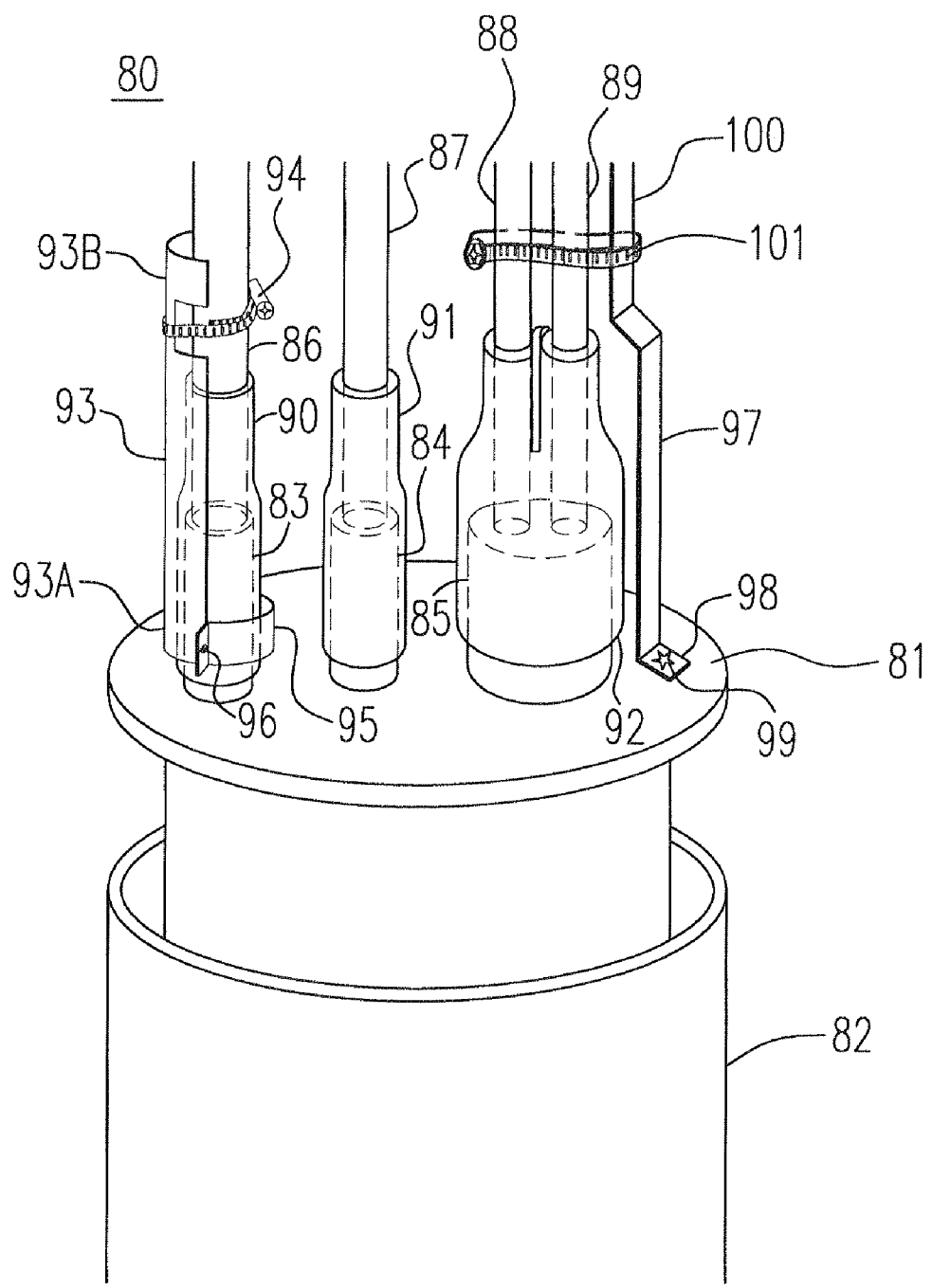
FIG. 5 is a diagram showing the cable fixture device of the communication cable splice box, shown in Embodiment 3 of the present invention.

Please refer to FIG. 5, which is a diagram showing the cable fixture device of the communication cable splice box, shown in Embodiment 3 of the present invention. In FIG. 5, communication cable splice box 80 (abbreviated as "splice box" thereafter) at least is constructed of cable entry board 81, protective cover 82 (partially), hollow cylindrical tubes 83, 84, 85, flexible rubber shrinkable tube 90, 91, and cable fixture device. Similar to the illustrations in Embodiment 1 and 2, hollow cylindrical tube 85 which supplies the main cables 88, 89 entered is wrapped around heat-shrink tube 92, completing the waterproofing among main cables 88, 89 and hollow cable tube 85. Further, the divided cables 86, 87 respectively enter the hollow cylindrical tube 83, 84 and wrap around flexible rubber shrinkable tubes 90, 91, completing the waterproofing among the divided cables 86, 87 and the hollow cylindrical tubes 83, 84.

Please continuously refer to FIG. 5, main cables 88, 89 can furthermore be secured by the cable fixture device. The exterior cable fixture device of splice box 80 can secure the divided cables and/or main cables. The cable fixture device includes the first fixture 98 and the second fixture 100. The first fixture 98 is secured on splice box 80, and this is completed by penetrating first fixture 98's screw hole (not shown) with screw 99 to form a screw connection with screw receptacle (not shown) located on cable entry board 81. The second fixture 100 is jointed with the first fixture 98, and the second fixture 100 secures main cables 88, 89, which were introduced into splice box 80 and were waterproofed with heat-shrink tube 92, using ring fastener 101. In addition, a clamp fastener or band fastener can also be used instead of ring fastener 101. The cable fixture device further includes supporting portion 97 which joints first fixture 98 with second fixture 100. This cable fixture device can also be used by the divided cable fixture which is wrapped by the shrinkable tube.

As shown in FIG. 5, divided cable 86 can be secured with cable fixture device, and cable fixture device includes: the first fixture 93A with clip 95 through the set up of screw 96 (and another screw, not shown in FIG. 5), secures the first fixture with the outer portion of the waterproof area of the hollow cylindrical tube—the shrinkable tube; and the second fixture 93B, through the screw on the locked clamp fastener 94, securing cable 86 which entered splice box 80. Through the design of the joint between second fixture 93B and first fixture 93A, cable 86 which is wrapped by shrinkable tube 90 is reinforced with splice box 80, thus strengthening the waterproofing effects of shrinkable tube 90.

The cable fixture device further includes supporting portion 93 for joining first fixture 93A and second fixture 93B. The second fixture 93B and supporting portion 93 can be one single piece, and the first fixture 93A and supporting portion 93 can be one single piece. Alternatively, the first fixture 93A, second fixture 93B and supporting portion 93 can be one single piece. In addition, supporting portion 93 can be jointed with first fixture 93A, and supporting portion 93 can be secured on splice box 80. Similarly, cable 86, which enters hollow cylindrical tube 83 and is wrapped by shrinkable tube 90, can also be secured in the same manner.

From the above descriptions of Embodiments 1, 2 and 3, the present invention can effectively improve on the prior technique of torching the heat-shrink tube to complete the waterproofing of one cable opening. When torching other cable openings of heat-shrink tubes, it often results in heat-shrink tubes that are already completed to be subjected to further torching, causing them to soften, loosen and resulting in water leakage problems in splice boxes. Since the current invention utilizes simple and safe construction, without the need for tools or a fire source, with a wider applicable outer diameter of cable along with other advantages, it can significantly reduce the cost of investing enterprises.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A communication cable splice box, comprising:
   a communication cable entry board;
   a first hollow cylindrical tube formed on the communication cable entry board;
   a flexible rubber shrinkable tube;
   an auxiliary installation apparatus disposed in an inner wall of the flexible rubber shrinkable tube, being removed after a communication cable penetrates through the first hollow cylindrical tube into the communication cable splice box so that the first hollow cylindrical tube and an exposed portion of the communication cable are wrapped by the flexible rubber shrinkable tube; and
   at least one communication cable fixture device securing thereto a portion of the communication cable which is not wrapped by the flexible rubber shrinkable tube.

2. The communication cable splice box according to claim 1, wherein at least one communication cable fixture device comprises:
   a first fixture fixed to the communication cable splice box; and
   a second fixture connected to the first fixture, wherein the second fixture secures thereto.

3. The communication cable splice box according to claim 2, wherein the at least one cable fixture device further comprises a supporting portion for connecting the first fixture with the second fixture, and the supporting portion is in one piece with one of the first fixture and the second fixture or is mechanically jointed with one of the first fixture and the second fixture.

4. A communication cable splice box, comprising:
   a communication cable entry board;
   a first hollow cylindrical tube formed on the communication cable entry board;
   a heat-shrink tube capable of being penetrated therethrough at least one first communication cable into the communication cable splice box for wrapping the at least one first communication cable by using a fire source;
   a second hollow cylindrical tube formed on the communication cable entry board and neighboring to the first hollow cylindrical tube;
   a flexible rubber shrinkable tube; and
   an auxiliary installation apparatus disposed in an inner wall of the flexible rubber shrinkable tube, being removed after a second communication cable penetrates through the second hollow cylindrical tube into the communication cable splice box so that the second hollow cylindrical tube and an exposed portion of the second communication cable are wrapped by the flexible rubber shrinkable tube.

5. The communication cable splice box according to claim 4 further comprising at least one cable fixture device comprising:
   a first fixture fixed to the communication cable splice box; and
   a second fixture connected to the first fixture, wherein the second fixture secures thereto at least one of the at least one first communication cable and the second communication cable.

6. The communication cable splice box according to claim 5 further comprising a supporting portion for connecting the first fixture with the second fixture.

7. A communication cable splice box with a waterproof shrinkable rubber tube device, comprising:
   a protective cover;
   a cable entry board;
   a first hollow cylindrical tube formed on the cable entry board;
   a flexible rubber shrinkable tube; and
   an auxiliary installation apparatus disposed in an inner wall of the flexible rubber shrinkable tube, being removed after a cable penetrates through the first hollow cylindrical tube into the communication cable splice box so that the first hollow cylindrical tube and an exposed portion of the cable are wrapped by the flexible rubber shrinkable tube.

8. The communication cable splice box according to claim 7, wherein the cable entry board comprises a second hollow cylindrical tube capable of supplying two cables sequentially penetrating through the second hollow cylindrical tube and into the communication cable splice box, wherein an exterior of the second hollow cylindrical tube and a respective portion of the two cables which does not penetrate the second hollow cylindrical tube form a waterproof structure with a heat-shrink tube.

9. The communication cable splice box according to claim 7, wherein the communication cable splice box further comprises at least one cable fixture device comprising:
   a first fixture fixed on the communication cable splice box; and
   a second fixture connected to the first fixture, wherein the second fixture secures the cable.

10. The communication cable splice box according to claim 9, wherein the first fixture is buried in the cable entry board.

11. The communication cable splice box according to claim 9, wherein the first fixture is integratedly formed on the cable entry board.

12. The communication cable splice box according to claim 9, wherein the first fixture is secured to the cable entry board by one selected from the group consisting of a screw connection, a mortise joint, a clamp joint, a ring fastener and a band fastener.

13. The communication cable splice box according to claim 9, wherein the second fixture is secured with the cable by one selected from the group consisting of a clamp joint, a ring fastener and a band fastener.

14. The communication cable splice box according to claim 9 further comprising a supporting portion for connecting the first fixture with the second fixture.

15. The communication cable splice box according to claim 14, wherein the second fixture is in one piece with the supporting portion.

16. The communication cable splice box according to claim 14, wherein the second fixture is mechanically jointed with the supporting portion.

17. The communication cable splice box according to claim 14, wherein the first fixture is in one piece with the supporting portion.

18. The communication cable splice box according to claim 14, wherein the first fixture is mechanically jointed with the supporting portion.

19. The communication cable splice box according to claim 14, wherein the supporting portion is connected to the first fixture, and the supporting portion is fixed to the communication cable splice box.

20. The communication cable splice box according to claim 14, wherein the supporting portion has a material being one selected from the group consisting of a metal, a plastic and a combination thereof.

\* \* \* \* \*